Jan. 23, 1962 R. L. BRIGHT ETAL 3,018,380

CURRENT BALANCING APPARATUS

Filed Oct. 31, 1958 2 Sheets-Sheet 1

WITNESSES

Edwin E. Bassler

Myron E. Click

INVENTORS
Richard L. Bright &
Robin R. Jackson
BY F. E. Browder
ATTORNEY

Jan. 23, 1962 R. L. BRIGHT ETAL 3,018,380

CURRENT BALANCING APPARATUS

Filed Oct. 31, 1958 2 Sheets-Sheet 2

United States Patent Office 3,018,380

Patented Jan. 23, 1962

3,018,380

CURRENT BALANCING APPARATUS

Richard L. Bright, Hempfield Township, Westmoreland County, Pa., and Robin R. Jackson, Ottawa, Ontario, Canada, assignors to Westinghouse Electric Corporation, East Pittsburgh, Pa., a corporation of Pennsylvania Filed Oct. 31, 1958, Ser. No. 771,087

2 Claims. (Cl. 307—58)

This invention relates to current balancing apparatus in general and in particular to current balancing apparatus for semiconductor rectifiers.

The dynamic resistance of semiconductor rectifiers is so small that two cells connected in parallel may carry greatly different currents. Since the advent and improvement of semiconductor diode rectifiers, much progress has been made in utilizing the diodes in varying applications, particularly where rugged and reliable apparatus is required. One outstanding application is the use of these rectifiers in supplying direct current power to a load from an alternating power source. Although the improvements in semiconductor rectifier units have allowed higher current ratings, it is still necessary to parallel many diodes to handle each phase of the alternating power in high power applications. Therefore, it has become extremely important to develop techniques for paralleling two or more rectifier units.

Several techniques have been used in the application of parallel semiconductor rectifiers. The most obvious method is to carefully match the forward characteristics of rectifier units. This method requires not only very careful design of bus work, but means that the rectifiers must be stacked in matched groups. Depending upon the type of rectifier unit available, four to six matched groups may be necessary.

A second method of paralleling will be to add resistors in series with each cell to provide sufficient dynamic resistance. This results in a loss of efficiency and poor regulation. In high power applications, this may be costly.

Accordingly, it is an object of this invention to provide an improved current balancing apparatus for paralleled semiconductor rectifiers.

It is another object of this invention to provide a method of paralleling semiconductor rectifier units by using balancing reactors to force the current to divide evenly among the parallel rectifier units.

Further objects of this invention will become apparent from the following description when taken in conjunction with the accompanying drawings. In said drawings, for illustrative purposes only, are shown preferred embodiments of this invention.

The use of a reactor to attach the problem of current unbalance has been employed before, for example, the paralleling of two anodes of a mercury arc rectifier. Though the method used is physically similar to the method described in this invention, the mode of operation and the problems confronted are different. Further, the fact that many semiconductor diode rectifiers are often connected in parallel generally requires a novel arrangement of the balancing reactors. For a discussion of the arrangement and mode of operations of the reactors in combination with mercury arc rectifiers, reference is made to "Current Balancing Reactors for Semiconductor Rectifiers" by I. K. Dortort, AIEE Transaction Paper No. 58–219.

Figure 1:
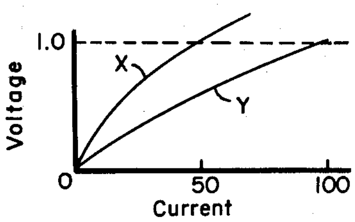
FIGURE 1 is a graphical representation of characteristics of two semiconductor rectifier diodes.

Referring to FIG. 1, it may be seen that the dynamic resistance of the semiconductor rectifiers is so small that two rectifier units connected in parallel may carry greatly different currents. The characteristic X of a first rectifier unti and the charatceristic Y of a second rectifier unit may vary sufficiently so that, as shown in FIG. 1, at one voltage unit the first rectifier is carrying 50 current units while a second rectifier is carrying 100 current units.

Figure 2:
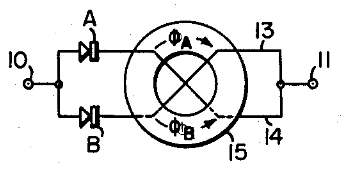
FIG. 2 is a schematic diagram of a first embodiment of this invention.

Referring to FIG. 2, there is shown an arrangement of paralleled rectifiers A and B in combination with a magnetic core 15 to more evenly balance the currents carried by the diodes A and B.

Figure 3:
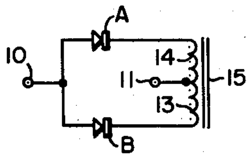
FIG. 3 is an alternate schematic representation of the apparatus illustrated in FIG. 2.

The magnetic core 15 is shown in the form of a toroid having the parallel conductors 13 and 14 threaded through the toroid 15 in opposite directions and connected between the terminals 10 and 11. The conductor 14, in series with the diode A, functions as a winding inductively disposed upon the toroid 15. The conductor 13, in series with the diode B, functions as a second winding inductively disposed upon the toroid 15. The arrangement of FIG. 2 is redrawn in FIG. 3 using the same reference characters for like components so that it may be more easily seen that the magnetic core 15 and the conductors 13 and 14 cooperate to form a reactor having a single, center-tapped winding inductively disposed thereon.

Referring again to FIG. 2, it is noted that current flowing through the conductor 14 will induce a flux $\phi_A$ in the magnetic core member 15 in a direction as shown. Current flowing through the diode B and the conductor 13 will induce a flux $\phi_B$ in the magnetic core 15 as shown. If the currents through the diodes A and B are exactly the same, no magnetic field will be produced in the core. If the current in diode A is greater than that in diode B, the currents will not cancel and a field will build up in the magnetic core 15. This increasing field in the magnetic core 15 will induce voltages in the conductors 14 and 13 tending to decrease the current flowing through the diode A and increase the current flowing through the diode B, thereby tending to balance the current carried by the diodes A and B.

Since the flux in the core 15 is not reset after each conduction period of the diodes A and B the operating point on the hysteresis curve of the particular magnetic material used will be the point of residual flux density, assuming that core has been in operation for a time. That is, during each conduction period the core will be excited toward a saturation point and will return to the residual flux point after the end of the conduction period.

Figure 9:
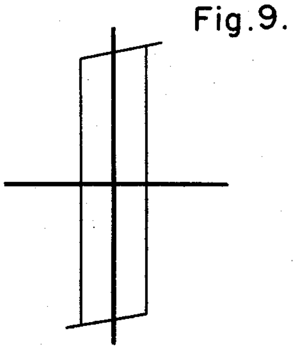
FIG. 9 is a graphical representation of a hysteresis loop of a first type of magnetic core material that may be used in this invention.
Figure 11:
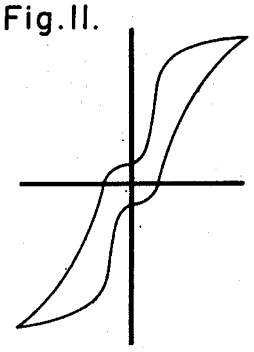
FIG. 11 is a representation of a hysteresis loop of a third type of magnetic material that may be utilized in this invention.
Figure 10:
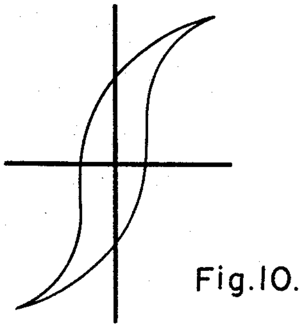
FIG. 10 is a graphical representation of a hystersis loop of a second type of magnetic material that may be utilized in this invention.

The amount of balancing by each reactor will be determined by the volt-seconds the core can absorb during each conduction period and by the magnetizing current; therefore the magnetizing current and the residual flux density point of the magnetic material are important. In FIG. 9 is shown a hysteresis loop of a magnetic material requiring a low magnetizing current but having a high residual point. In FIG. 10 the hysteresis loop of a second magnetic material indicates a higher magnetizing current required than FIG. 9, but a lower comparable residual point. Air gaps as well as different alloys of magnetic material may be employed to attain the desired shape of the hysteresis loop. FIG. 11 is a hysteresis loop of a magnetic material comprised of 16% aluminum-iron alloy, and, as shown, gives a very low residual flux density point. The magnetic material, as well as the number of turns of each conductor will be chosen to best fit the particular application and the amount of average unbalance of a particular lot of commercially available diodes.

Figure 4:
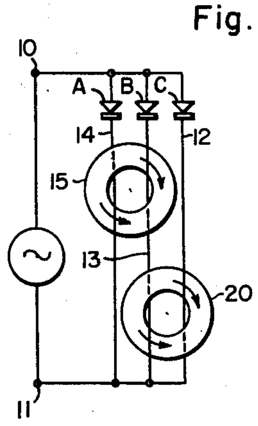
FIG. 4 is a schematic diagram of a second embodiment of this invention.

Referring to FIG. 4, there is illustrated a second embodiment of the teachings of this invention, in which like components of FIGS. 2 and 4 have been given the same reference characters. The main distinction between FIGS. 2 and 4 is that in FIG. 4, a third semiconductor diode rectifier C has been added in parallel with the diodes A and B. A second magnetic core 20 has been added to balance the current flow in the three diodes. The conductor 13 in series with the diode B is threaded through the magnetic core 20 in one direction. A conductor 12 in series with the diode C is threaded through the core 20 in the other direction. The flow of current through the conductors 12 and 13 inductively associated with the core 20 operate in the same manner as described hereinbefore for the core 15 and conductors 13 and 14 of FIG. 2. In this manner, the current being carried through the diodes B and C tends to be divided evenly. Since the core 15 is also forcing more even current distribution between the diodes A and B, thus the diodes A, B and C tend to carry an equal distribution of current.

Figure 5:
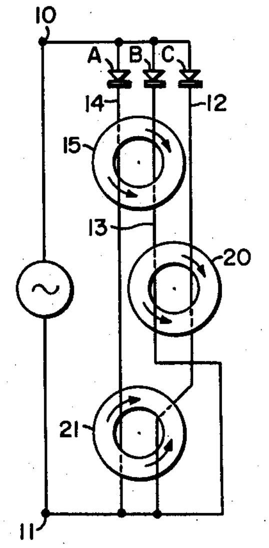
FIG. 5 is a schematic diagram of a third embodiment of this invention.

Referring to FIG. 5, there is illustrated a third embodiment of this invention, in which like components of FIGS. 4 and 5 have been given the same reference characters. The main distinction between the apparatus illustrated in FIGS. 4 and 5 is that in FIG. 5 an additional magnetic core 21 has been added. The conductor 12 in series with the diode C, and the conductor 14, in series with the diode A, have been threaded through the core 21 in opposite directions.

The operation of the toroid or magnetic core 21 in cooperation with the current flowing through the conductors 14 and 12 in tending to cause a more evenly distributed current flow through the diodes A and C is the same as hereinbefore described. However, the addition of the magnetic core 21 and the inductive disposition of the conductors 12 and 14 therewith brings the current distribution in the three diodes A, B and C even more closely together than the current distribution for the apparatus illustrated in FIG. 4. This is true because in the apparatus of FIG. 4, even though A and B are brought closer to even current distribution by the toroid or magnetic core 15, and B and C are brought closer to even distribution by the toroid or magnetic core 20, nevertheless, there may be a slight current unbalance between A and B and B and C. This slight current unbalance may be additive so that the difference in the current carried by the diodes A and B may be half of the difference of the current carried by the diodes A and C. Thus, if a great number of diodes were paralleled with magnetic cores inductively disposed between the first and second conductors, second and third conductors, third and fourth conductors . . . and $(N-1)$ and $N$th conductors, respectively, the current unbalance in the chain of parallel diodes could be additive so that the first diode is carrying many times less or many times more current than the last diode of the chain. The apparatus illustrated in FIG. 5 closes the chain of diodes by referring current carried by the last diode to the current carried by the first diode, thus tending to cause a more equal distribution of current in each diode throughout the chain of paralleled diodes.

Figure 6:
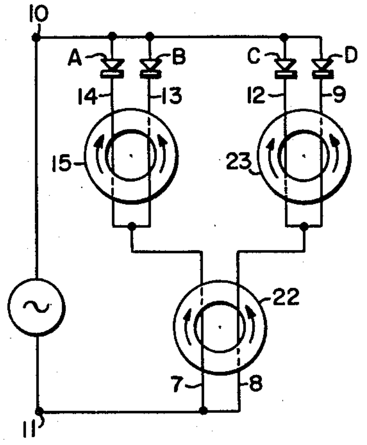
FIG. 6 is a schematic diagram of a fourth embodiment of this invention.

Referring to FIG. 6, there is illustrated a fourth embodiment of the teachings of this invention, in which like components of FIGS. 2 and 6 have been given the same reference characters. The main distinction between the apparatus illustrated in FIGS. 2 and 6 is that in FIG. 6, the diodes C and D are shown connected as a pair with series conductors 12 and 9, respectively, and paralleled with the pair of diodes A and B. The conductors 14 and 13 of the diodes A and B join and continue as a conductor 7. The conductors 12 and 9 of the diodes C and D join and continue as a conductor 8. The conductors 7 and 8 are threaded in opposite directions through a toroid or magnetic core 32.

The conductors 14 and 13 in cooperation with the magnetic core 15 and the conductors 12 and 9 in cooperation with the magnetic core 23 operate as hereinbefore described. The conductors 7 and 8 in cooperation with the magnetic core 22 also operate in the same manner as hereinbefore described to force equal current distribution in the conductors 7 and 8. Thus, the diodes A, B, C and D are forced to have more equal current distribution than if the magnetic core 22 and conductors 7 and 8 were omitted. Since the reactor comprising the magnetic core 22 and the conductors 7 and 8 must carry the total current from the reactors comprising the magnetic cores 15 and 23 and the conductors 14, 13 and 12, 9, respectively, the magnetic core 22 must be of a different design. This change in design can be effected by change in core 22 design or the change in the number of turns of conductors 7 and 8 with respect to the core 22. With the arrangement of FIG. 6, the maximum unbalance current between the diode carrying the highest current and the diode carrying the lowest current, can be as great as the magnetizing current of one of the magnetic cores 15 or 23 of half of the magnetizing current of the core 22.

The arrangement illustrated in FIG. 6 may be described as an apparatus for balancing current comprising: $2^N$ pairs of semiconductor rectifier units where N is an integer having a value of at least one; each said pair comprising first and second conductors connecting first and second semiconductor units in parallel between first and second junctions, a magnetic core having said first and second conductors disposed in opposing inductive relationship therewith, and a third conductor connected to said second junction of each said pair; each of said third conductors being disposed in opposing inductive relationship on a magnetic core with another of said third conductors and being connected thereafter at a third junction.

The arrangement illustrated in FIG. 6 may also be described as an apparatus for balancing current comprising: a plurality of groups of pairs of conductors; the number of pairs in each group diminishing in a geometric progression described by $2^N$, $2^{(N-1)}$, $2^{(N-2)}$, $2^{(N-3)}$ . . . wherein N is an integer having a value of at least one and wherein the value of any 2 taken to its associated power is never less than two; each pair of one of said groups of pairs of conductors comprising first and second conductors connecting first and second semiconductor rectifiers in parallel between first and second junctions; each pair of conductors of each group being connected to a single conductor of a pair in another group; a magnetic core for each of said pairs of conductors having each conductor of said pair disposed in opposing inductive relationship therewith.

Figure 7:
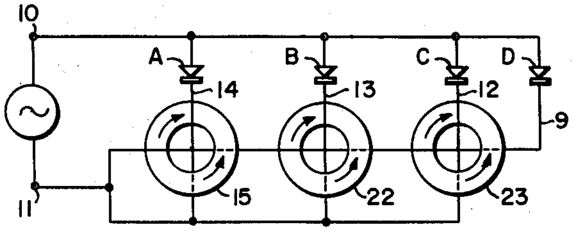
FIG. 7 is a schematic diagram of a fifth embodiment of this invention.

Referring to FIG. 7, there is illustrated a fifth embodiment of the teachings of this invention in which like components of FIGS. 6 and 7 have been given the same reference characters. The main distinction between the apparatus illustrated in FIGS. 6 and 7 is that in FIG. 7, a different arrangement of the conductors connected in series with the parallel diodes A, B, C and D, respectively, with respect to the magnetic cores 15, 22 and 23 has been effected. The conductor 14 is again threaded through the toroid 15. The conductor 13 is threaded through the toroid 22. The conductor 12 is threaded through the toroid 23. However, the conductor 9 in series with the diode D is threaded through all three of the toroids 15, 22 and 23, in the opposite inductive direction as the conductors 14, 13 and 12, respectively.

In the apparatus of FIG. 7 the diode D acts as a reference cell or rectifier to the other plurality of diodes that are paralleled therewith. Since the various conductors and magnetic cores operate in the same fashion as hereinbefore described, each conductor inductively disposed with a toroid is forced to carry very nearly the same current as the other conductor inductively disposed with the same toroid. Since the conductor 9 is disposed inductively with all of the magnetic cores in the chain of paralleled diodes, the conductor 9 acts as a reference for all of the current carrying conductors and the unbalance of each conductor varies only from the references established by the conductor 9. To increase the reliability of the critical diode D, the lead or conductor 9 from this cell or diode may be looped back so that it makes, for example, two turns through each core. In that particular example, the reference cell D would only carry one-half the current of each of the other cells A, B and C. Also diode D may consist of two or more units in parallel, any one of which could carry the full current of conductor 9.

Figure 8:
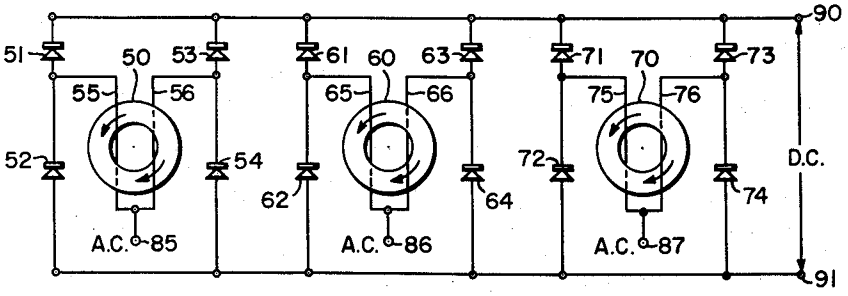
FIG. 8 is a schematic diagram of a sixth embodiment of this invention.

Referring to FIG. 8, there is illustrated a sixth embodiment of the teachings of this invention. The embodiment shown in FIG. 8 is the simplest form of paralleling semiconductor diodes for a three-phase bridge connection to give a direct current output at a pair of terminals 90 and 91.

For a first phase, serially connected diodes 51 and 52 are connected in parallel with the series connected diodes 53 and 54. The junctions of the diodes 51 and 52 and of the diodes 53 and 54 are connected by conductors 55 and 56, respectively, to a first phase of alternating current at the terminal 85. The conductors 55 and 56 are threaded in opposite directions through the magnetic core 50.

The series connected diodes 61 and 62 are connected in parallel with the series connected diodes 63 and 64, across the terminals 90 and 91. The junction of the diodes 61 and 62 and the junction of the diodes 63 and 64 are connected by the conductors 65 and 66, respectively, to a second phase of alternating current at the terminal 86. The conductors 65 and 66 are threaded through a magnetic core 60 in opposite directions.

For a third phase, the serially connected diodes 71 and 72 are connected in parallel with the serially connected diodes 73 and 74 across the terminals 90 and 91. The junction of the diodes 71 and 72 and of the diodes 73 and 74 are connected by the conductors 75 and 76, respectively, to a third phase of the alternating current at the terminal 87.

The magnetic cores 50, 60 and 70 function as hereinbefore described to tend to cause equal current distribution in the conductors 55, 56 and 65, 66 and 75, 76, respectively. Thus, it may be seen that only one magnetic core for each two paralleled diodes is necessary for paralleling a three-phase bridge connection. As the number of diodes paralleled in each phase of the three-phase bridge increases, arrangements for each phase may be chosen from the embodiments hereinbefore described to effect a more equal current distribution between the paralleled diodes of each phase.

In conclusion, it is pointed out that while the illustrated examples constitute preferred embodiments of our invention, we do not limit ourselves to the exact details shown, since modifications of the same may be varied without departing from the spirit and scope of this invention.

We claim as our invention:

1. Apparatus for balancing current comprising; a plurality of semiconductor rectifier units connected in parallel circuit relationship by a like plurality of conductors; one of said plurality of conductors being a reference conductor; each of said plurality of conductors, with the exception of said reference conductor, being disposed inductively with one of a like plurality of magnetic cores; said reference conductor being disposed in inductive relationship with each of said plurality of magnetic cores.

2. Apparatus for balancing current comprising; a plurality of semiconductor rectifier units connected in parallel circuit relationship by a like plurality of conductors; one of said plurality of conductors being a reference conductor; each of said plurality of conductors, with the exception of said reference conductor, being disposed inductively with one of a like plurality of magnetic cores; said reference conductor being disposed in opposed inductive relationship, with respect to each of the other said conductors, with each of said plurality of magnetic cores.

References Cited in the file of this patent

UNITED STATES PATENTS

| | | |
|---|---|---|
| 2,700,129 | Guanella | Jan. 18, 1955 |
| 2,891,212 | Bingham | June 16, 1959 |

OTHER REFERENCES

"Balancing Reactors For Semiconductor Rectifiers" (Dortort), AIEE (July 1958), page 589 relied on.